United States Patent [19]
Wheatley

[11] Patent Number: 6,126,226
[45] Date of Patent: Oct. 3, 2000

[54] TONNEAU ASSEMBLY AND A MOISTURE DRAINAGE METHOD FOR USE WITH A TONNEAU ASSEMBLY

[76] Inventor: Donald G. Wheatley, 4451 Ford Rd., Ann Arbor, Mich. 48105

[21] Appl. No.: 08/998,217

[22] Filed: Dec. 24, 1997

[51] Int. Cl.[7] .................................................. B60P 7/02
[52] U.S. Cl. ............................... 296/100.17; 296/100.01
[58] Field of Search ..................... 296/100.01, 100.02, 296/100.07, 39.1, 39.2, 100.17, 100.18, 100.16

[56] References Cited

U.S. PATENT DOCUMENTS

| | | |
|---|---|---|
| 906,914 | 12/1908 | Nelson . |
| 3,426,367 | 2/1969 | Bradford . |
| 3,472,539 | 10/1969 | Fenwick . |
| 3,975,467 | 8/1976 | Beck .......................................... 261/30 |
| 4,017,943 | 4/1977 | Moore . |
| 4,030,735 | 6/1977 | Jacob . |
| 4,181,230 | 1/1980 | Acuff . |
| 4,187,576 | 2/1980 | Deibel et al. . |
| 4,247,216 | 1/1981 | Pansini . |
| 4,273,377 | 6/1981 | Alexander ................................ 296/100 |
| 4,287,654 | 9/1981 | Chrysler ................................ 29/401.1 |
| 4,350,378 | 9/1982 | Wakamatsu . |
| 4,431,331 | 2/1984 | Brody . |
| 4,528,998 | 7/1985 | Gamm . |
| 4,582,358 | 4/1986 | Draper ..................................... 296/213 |
| 4,639,033 | 1/1987 | Wheatley et al. . |
| 4,682,618 | 7/1987 | Zwick . |
| 4,730,866 | 3/1988 | Nett . |
| 4,783,112 | 11/1988 | Lovaas ..................................... 296/100 |
| 4,826,226 | 5/1989 | Klie . |
| 4,832,394 | 5/1989 | Macomber .............................. 296/100 |
| 4,838,602 | 6/1989 | Nett . |
| 4,968,076 | 11/1990 | Kuroki . |
| 5,058,340 | 10/1991 | Muller . |
| 5,058,652 | 10/1991 | Wheatley et al. . |
| 5,121,960 | 6/1992 | Wheatley . |
| 5,152,574 | 10/1992 | Tucker . |
| 5,207,262 | 5/1993 | Rushford . |
| 5,251,951 | 10/1993 | Wheatley . |
| 5,261,719 | 11/1993 | Tucker . |
| 5,275,458 | 1/1994 | Barben et al. . |
| 5,301,913 | 4/1994 | Wheatley . |
| 5,310,238 | 5/1994 | Wheatley . |
| 5,344,209 | 9/1994 | Regner ..................................... 296/223 |
| 5,365,994 | 11/1994 | Wheatley et al. . |
| 5,460,423 | 10/1995 | Kersting et al. . |
| 5,472,256 | 12/1995 | Tucker . |
| 5,487,585 | 1/1996 | Wheatley . |
| 5,540,475 | 7/1996 | Kersting et al. . |
| 5,553,652 | 9/1996 | Rushford . |
| 5,590,974 | 1/1997 | Yang . |
| 5,609,374 | 3/1997 | Sawae et al. . |
| 5,865,498 | 2/1999 | Grogan ..................................... 296/163 |
| 5,934,735 | 8/1999 | Wheatley . |
| 5,971,469 | 10/1999 | Lund et al. ............................ 296/100.01 |

*Primary Examiner*—Stephen T. Gordon
*Assistant Examiner*—Jason Morrow
*Attorney, Agent, or Firm*—Chupa & Alberti, P.C.

[57] ABSTRACT

A tonneau assembly (10) having improved moisture drainage characteristics and including a mounting structure (15) and a tonneau cover (12) which is removably attached to the structure (15) and which is adapted to flexibly and selectively overlay and substantially seal the bed (18) of a vehicle (20).

12 Claims, 5 Drawing Sheets

TONNEAU ASSEMBLY AND A MOISTURE DRAINAGE METHOD FOR USE WITH A TONNEAU ASSEMBLY

FIELD OF THE INVENTION

The present invention generally relates to a tonneau assembly and, more particularly, to a tonneau assembly having improved moisture drainage characteristics and which further allows a tonneau cover to be relatively easily and selectively secured over the bed of a vehicle. The present invention further relates to a method for use with a tonneau assembly which allows the tonneau assembly to have improved moisture drainage characteristics.

BACKGROUND OF THE INVENTION

Tonneau covers are generally deployed over the bed of a vehicle, such as and without limitation a typical "pick-up", truck, in order to shield the contents of the bed from view, sunshine, and/or inclement (e.g. rainy) weather. Particularly, the tonneau cover is normally provided as part of an overall tonneau cover assembly. Such an assembly normally includes several members which may be selectively and removably connected to cooperatively form a frame or tonneau cover supporting structure. Particularly, some or all of these members are normally adapted to be removably deployed upon the various bed rails of the vehicle and, when properly deployed upon these rails and properly connected, are adapted to cooperatively provide a supporting structure upon which the tonneau cover rests and is capable of being moved between a first "stored" position in which the cover is generally folded or rolled in a manner which allows most or substantially all of the truck or vehicle bed to be exposed and a second operative or extended cab overlay or covering position in which most of the bed is covered. Of course, the tonneau cover may also be deployed so as to only partially cover the bed of the vehicle in one of many intermediate positions between the previously delineated first and second positions.

One of the primary uses of these tonneau covers and associated assemblies is to keep the bed of the vehicle and those items placed within the bed dry or substantially moisture-free. Hence, it is highly desirable to provide tonneau assemblies which form a substantially waterproof or moisture-proof seal over the vehicle bed, thereby protecting the bed and the contents of the bed against moisture or water damage. Therefore, it is highly undesirable for a tonneau cover assembly to allow rain or moisture to enter the bed of the vehicle once the tonneau cover is removed from its rolled or stored position to its fully extended operative bed covering position, since such moisture may damage or destroy the items located in the bed. Those very items are to be protected by the tonneau cover assembly from just this very sort of moisture related damage.

One of the major drawbacks associated with many of these prior tonneau cover assemblies is that these prior assemblies allow rain or other types of moisture to enter or "seep through" the assembly, thereby causing the protected bed and associated contents to become wet, even though the tonneau cover was fully extended to its cab covering position. This deficiency may be particularly present in those assemblies deployed upon unitized vehicles where the back of the cab essentially forms the front of the bed. Applicant has discovered that substantially all of this undesirable moisture, in many of these prior tonneau assemblies, especially those deployed upon these unitized vehicles, enters the bed in the space located between the back of the cab of the vehicle and the tonneau cover assembly.

There is therefore a need for a tonneau cover assembly which overcomes the drawbacks of the prior art and which substantially prevents water or moisture from entering into the bed, especially in the area between the back or rear of the cab and the tonneau cover assembly. There is also a need for such a tonneau cover assembly which overcomes the disadvantages of the prior art and which is further adapted to allow a tonneau cover to be relatively quickly, easily and selectively moved between a first stored position and a second operative bed overlaying position. Applicant's invention addresses these drawbacks associated with these prior tonneau cover assemblies and provides a new and useful tonneau cover assembly having improved moisture drainage characteristics.

SUMMARY OF THE INVENTION

It is therefore a primary object of the invention to provide a tonneau cover assembly which overcomes the previously delineated disadvantages of the prior art.

It is another object of the invention to provide a tonneau cover assembly which overcomes the previously delineated disadvantages of the prior art and which substantially prevents moisture or other material from entering the bed, especially through or by means of the area or space between the cab and the deployed or installed tonneau cover assembly.

It is another object of the invention to provide a tonneau cover assembly which overcomes the previously delineated disadvantages of the prior art and which is further characterized by its ability to allow a tonneau cover to be relatively easily and selectively deployed over the bed of a vehicle.

It is yet another object of the invention to provide a tonneau cover assembly made in accordance with one of several methods of this invention and which provides a desirable and substantially moisture-proof or waterproof seal or barrier over the open "top" portion of the vehicle bed.

According to one aspect of the present invention a tonneau assembly for selectively covering a certain bed of a vehicle is provided, the bed being formed by substantially identical side rails and the cab of the vehicle. According to this first aspect of the present invention the tonneau assembly includes a tonneau cover; a first member adapted to removably abut to the cab and having a first grooved surface; side rail members, each removably attached to a unique one of the side rails and adapted to cooperate with the first member to provide a support for the tonneau cover; and first and second substantially identical corner members, each of the first and second corner members having substantially identical grooved surfaces and being adapted to be removably secured to opposite ends of the first member and to the side rail members in a manner in which the respective groove surfaces of each of the first and second corner members are in communication with the grooved surface of the first member, thereby cooperatively providing a channel which operatively drains moisture away from the vehicle bed and from the tonneau cover.

According to a second aspect of the present invention a tonneau assembly for use over a bed of a vehicle is provided. The tonneau assembly, made in accordance with this second aspect of the invention, is adapted to draw water away from the tonneau cover and the vehicle bed and includes a tonneau cover; a substantially "U" shaped member adapted to be secured within the bed of the vehicle and having an opening therein; member means, removably attached to the "U" shaped member for cooperating with the "U" shaped member to provide a tonneau cover support; and a drain, connected to the substantially "U" shaped member and effective to channel or drain water away from the tonneau cover and the vehicle bed.

According to yet a third aspect of the present invention a method is provided. The method is adapted for use with a tonneau cover assembly and is effective to drain or channel water away from the assembly and the bed of the vehicle. According to this third aspect of the invention the tonneau cover assembly has two substantially identical rail members which each are adapted to be removably attached to a unique one of the vehicle side rails and a third member which is adapted to be connected to the two substantially identical rail members by a plurality of corner members, thereby providing a tonneau cover support which allows the supported tonneau cover to be selectively moved from a first stored position to a bed covering second position. Particularly, the method comprises the steps of creating channels in the first member and in the plurality of corner members and causing the created channels to be communicating relation, thereby allowing moisture upon the tonneau cover to be removed from the tonneau cover and the bed by use of these communicating channels.

Further objects, features, and advantages of the present invention will become apparent from a consideration of the following description and the subjoined claims, when taken in conjunction with the accompanying drawings.

BRIEF DESCRIPTION OF THE DRAWINGS

For a substantially full and more complete understanding of the nature and objects of the present invention, reference should be had to the following drawings in which.

DETAILED DESCRIPTION OF THE INVENTION

Figure 1:
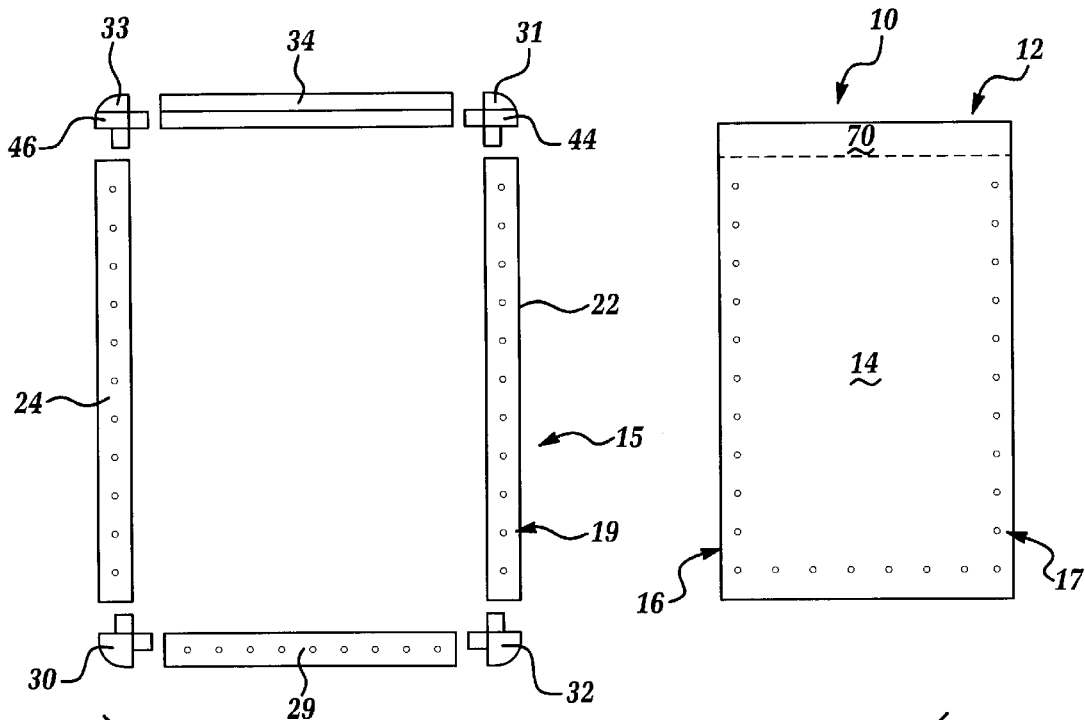
FIG. 1 is a top unassembled view of the various components of a tonneau assembly made in accordance with the teachings of the preferred embodiment of this invention.
Figure 2:
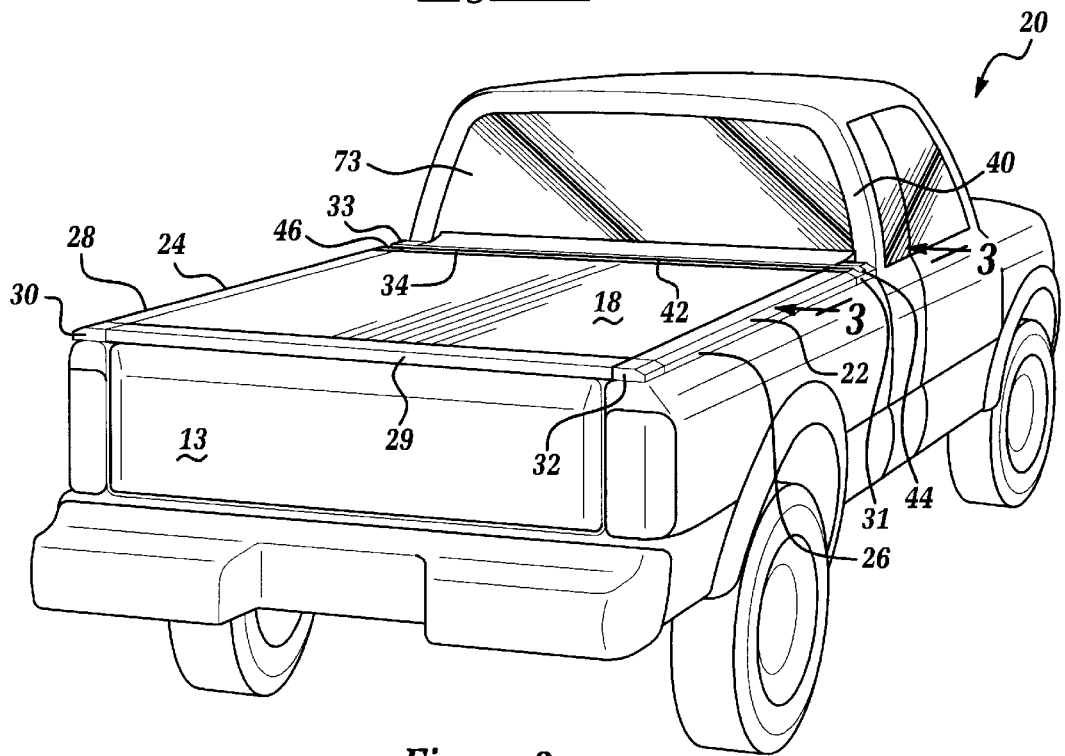
FIG. 2 is a perspective assembled view of the tonneau assembly shown in FIG. 1 attached to or selectively deployed upon a typical pick-up truck vehicle.
Figure 9:
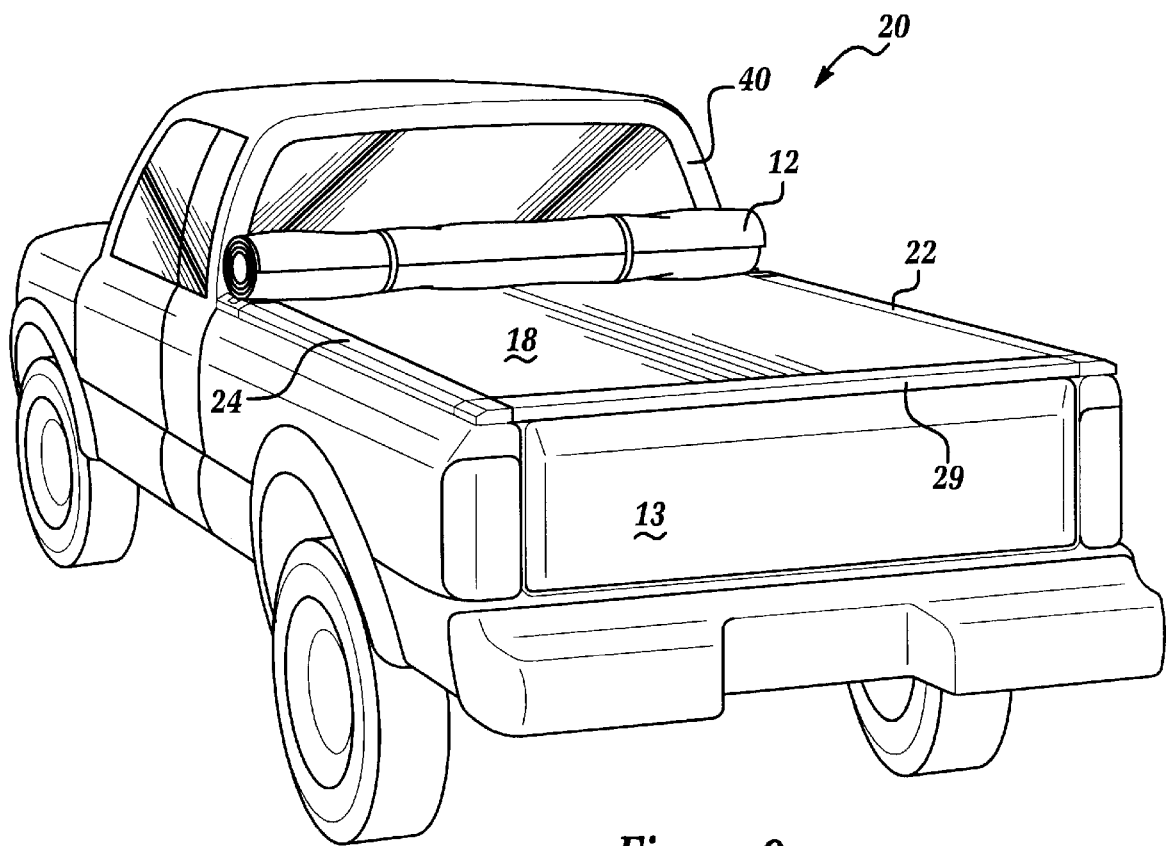
FIG. 9 is a view similar to that shown in FIG. 2 and further illustrating the movement of the tonneau cover to a stored or rolled position.

Referring now to FIG. 1, there is shown a tonneau assembly 10 made in accordance with the teachings of the preferred embodiment of the invention. As shown, tonneau assembly 10 includes a mounting structure 15 and a tonneau cover 12 which, as will be appreciated by those of ordinary skill in the art, has a bottom or "bed facing" surface 14 and an opposed top surface 16, and which is further adapted to conform to and be slightly larger than the area defined by the bed 18 of vehicle 20 shown in FIG. 2. Particularly, cover 12 is adapted to flexibly and selectively overlay and substantially seal cab 18 by its deployment over mounting structure 15 or to be moved to a stored or rolled position as illustrated in FIG. 9. Removable attachment of cover 12 to structure 15 may be accomplished by conventional "snap type fastener mechanisms" 17 having a corresponding "snap" type receptacle 19 on each of the members 22, 24, 29 and 34 or a variety of other known attachment or fastener devices or methods.

Tonneau cover mounting structure 15 includes, in one embodiment, substantially identical elongated rail members 22, 24 which are adapted to be removably secured upon respective side rails 26,28 of vehicle 20 by known means. Elongated rail members 22, 24 may be attached to side rails 26, 28 by clamps, bolts, or other adhesive means as shown and described in U.S. Pat. Nos. 4,639,033 and 5,058,652 of Wheatley, as well as in U.S. Pat. Nos. 4,730,866 and 4,838,602 of Nett, all of which are fully and completely incorporated herein by reference, word for word and paragraph for paragraph as set forth below.

Structure 15 further includes a member 34 and a member 29 which is adapted to be removably attached to members 22,24 by use of substantially identical corner members 30,32 and, when connected to side rails 22, 24, is adapted to extend substantially over the tailgate 13 of vehicle 20. Member 34 is also adapted to be removably attached to members 22,24 by use of substantially identical corner members 31, 33 and is deployed in close proximity and/or in abutment relation to cab 40. Corner members 30–33 may be removably connected to respective members 29 and 34 by known means.

Tonneau cover assemblies are generally known to those of skill in the art and are, for example and without limitation, described in U.S. Pat. No. 4,730,866, which issued on Mar. 15, 1988 to James A. Nett and which is fully and completely incorporated herein by reference. Such prior tonneau cover assemblies are further described in U.S. Pat. No. 5,058,652 which issued on Oct. 22, 1991 to Applicant and which is also fully and completely incorporated herein by reference. Moreover, such tonneau cover assemblies are also further described in U.S. Pat. No. 5,121,960, which issued on Jun. 16, 1992 to Applicant and which is also fully and completely incorporated herein by reference. Applicant provides a new and improved tonneau cover assembly and a method which may be used to improve the drainage characteristics of these prior assemblies.

Figure 3:
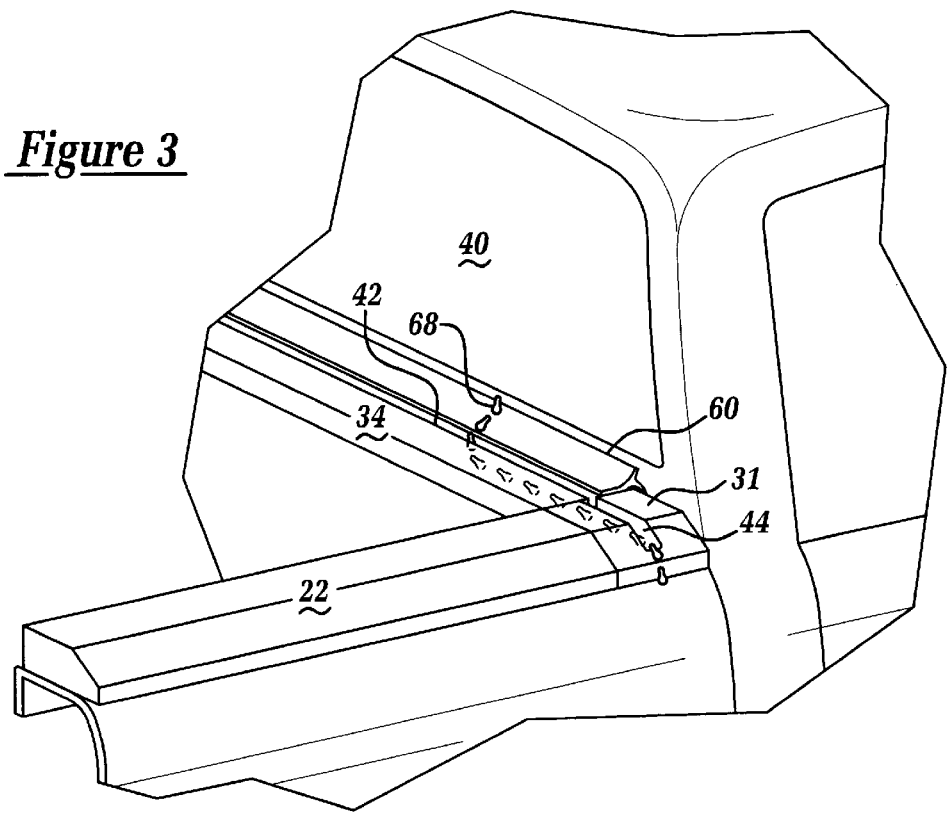
FIG. 3 is a fragmentary perspective view, to a larger scale, substantially taken along view line 3-3' of FIG. 2 and showing a portion of the tonneau cover assembly of the preferred embodiment of this invention selectively deployed and/or assembled upon the vehicle shown in FIG. 1.
Figure 4:
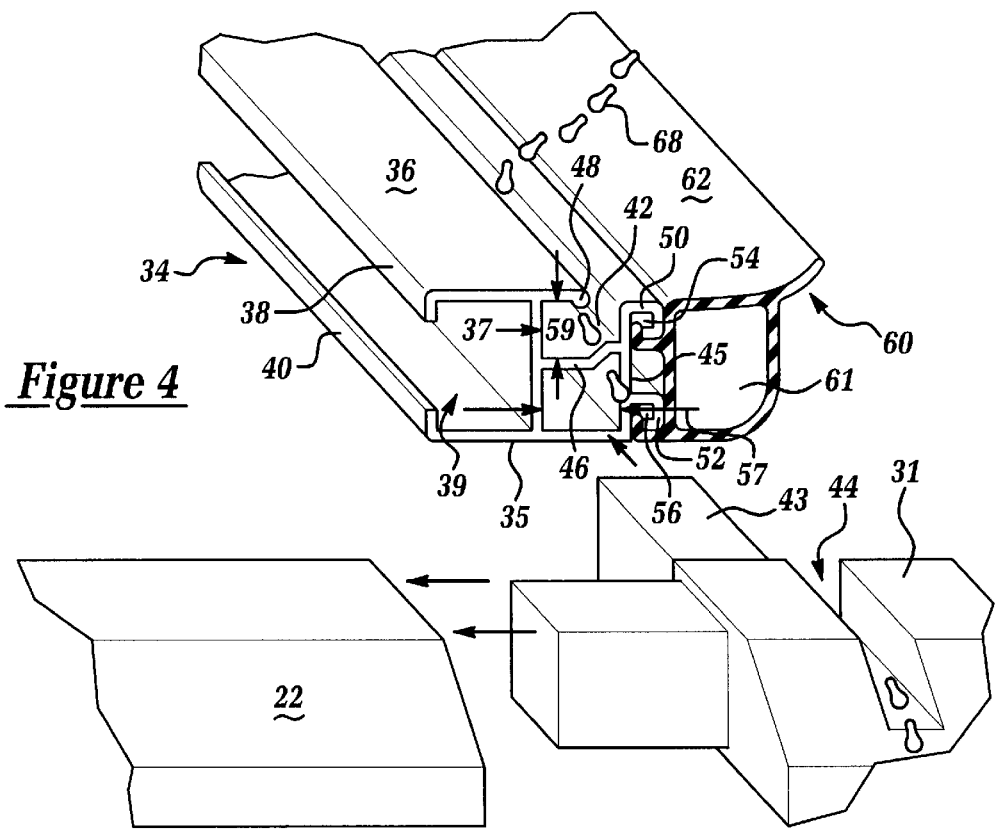
FIG. 4 is a view similar to that of FIG. 3 but showing the tonneau assembly of the preferred embodiment of the invention selectively disassembled from the vehicle shown in FIG. 1.
Figure 5:
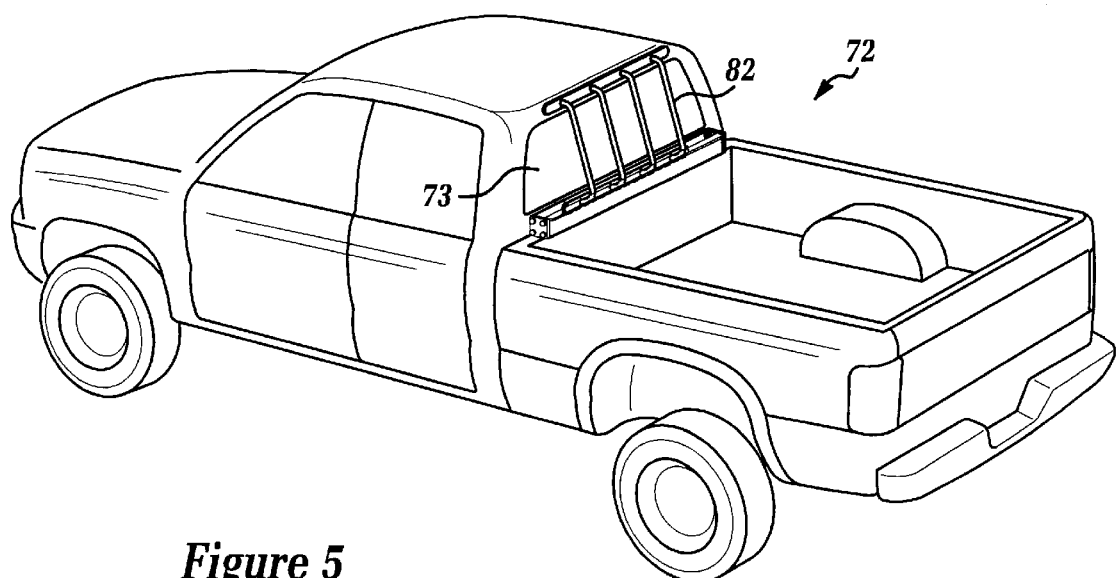
FIG. 5 is a perspective view of a typical "pick-up" truck upon which a tonneau cover assembly made in accordance with the teachings of a second embodiment of the invention may be deployed.

Referring now to FIGS. 3 and 4, according to this first embodiment of the invention, front member 34 (e.g. the member which is proximate to and/or abutting cab 40) is a generally elongated extruded rail type member having a generally flat bottom (bed facing) wall portion 35 and an opposed general flat top wall portion 36 which are integrally and generally orthogonally interconnected by a wall 37 substantially intermediate along their respective widths. Wall portions 35 and 36 further respectively have edge portions 38, 40 which are longitudinally coextensively positioned along rail 34 and which cooperate with walls 35, 36, and 37 to form a substantially "c" shaped reception slot 39 into which male member 43 of each of the corner members 31, 33 may be frictionally and removably secured. It should be appreciated by those of ordinary skill in the art that while FIGS. 3 and 4 show the deployment of corner member 31 into rail 34, the deployment of corner member 33 into rail 34 is substantially similar.

Further, member 34 also includes an integrally formed back or cab facing wall portion 45 which is positioned substantially parallel to wall 37, which is longitudinally coextensive to wall 37 and which is integrally connected to wall 37 by a step or groove member 46 having a first lower portion integrally connected to wall 37 and a second raised or higher portion connected to wall 45. Longitudinally coextensive edge portion 48 overlays step member 46 along the entire length of member 34.

As should be apparent to those of ordinary skill in the art, trench or step member 46 cooperates with wall portions 37 and 45 to form a trench or groove 42 which is adapted to drain or channel moisture away from the tonneau cover assembly 10. Particularly, edge 48 is adapted to cause moisture on top wall 36 to be directed into channel or trench 42.

Further, wall 45 has integrally formed and longitudinally coextensive opposed folded edges 50, 52 having a substantially "J" shaped cross section and which are adapted to frictionally and removably engage corresponding "J" shaped cross sectional edges 54, 56 which are integrally formed within and longitudinally coextensive to seal 60, thereby ensuring that seal 60 remains positioned between cab 40 and member 34.

Substantially center positioned "groove" or "trench" 42, in one embodiment, has a width 57 of about one inch and a maximum depth 59 of about one half inch (though other dimensions may be utilized) and substantially traverses the entire outer surface (e.g. the surface which faces away from the interior of bed 18) of member 34. Further, each corner member 31,33, in this first preferred embodiment of the invention, further includes substantially identical grooves or trenches 44,46 which are each substantially identical in width and maximum depth to those previously delineated dimensions with respect to groove or trench 42 and which are each substantially centered along the entire length of each of their respective outer surfaces (the respective surfaces of which face away from the interior of bed 18).

As best shown in FIGS. 3 and 4, after assembly of structure 15 is completed, grooves or trenches 34, 44, and 46 communicate, thereby, in one embodiment, forming one contiguous channel substantially along the entire length of cab 40 and cooperatively functioning to channel or direct water or other moisture 68 away from the tonneau cover 12 and box or bed 18, towards the sides of vehicle 20.

In one embodiment of the invention, these cooperating and communicating channels are centrally aligned (e.g. the respective longitudinal axes of symmetry of channels 44, 46 and 42 are aligned). The use of such communicating and aligned grooves or trenches provides for a tonneau cover assembly which has enhanced water or moisture barrier properties, especially in the area between the cab 40 and assembly 10, and provides for a substantially waterproof or moisture-proof seal over the covered box or bed area 18 when the tonneau cover is extended to its fully operative or cab covering position. Importantly, Applicant's invention provides for this enhanced and substantially waterproof or moisture-proof seal without substantially and detrimentally effecting the relatively easy movement of tonneau cover 12 from a first stored position to an operative bed overlaying position or complicating the deployment of assembly 10 upon a vehicle. Further, by creating these cooperatively communicating channels 42, 44, and 46 in virtually any existing tonneau cover assembly (such as by cutting or other conventional groove or trench forming means), Applicant has discovered a relatively efficient method to enhance the waterproof and moisture-proof characteristics of such prior tonneau cover assemblies without detrimentally effecting or greatly complicating the use and/or deployment of these prior tonneau cover assemblies upon a vehicle.

As further shown in FIGS. 3 and 4, elongated seal 60, made of a flexible material such as commercially available rubber, is deployed along substantially the entire length between the cab 40 and member 34. In this particular embodiment, seal 60 has a generally rectangular cross section 61 and a curved upper longitudinally coextensive lip portion 62 which rests against cab 18 in a manner which allows this portion 62 to direct water or other moisture 68 into the communicating channels or trenches 42, 44, 46 and away from the tonneau cover 12, cab 40 and bed 18. The use of such a seal 60 enhances the ability of Applicants' tonneau cover assembly to direct or channel moisture away from the cab and provides an even greater enhanced moisture-proof or waterproof seal over the bed. Further, as best shown in FIG. 1, cover 12 may further include a flexible seal 70, made of commercially available rubber or a similar material, sewn into the tonneau fabric and adapted to overlay seal 60 and provide a further moisture barrier.

Referring now to FIGS. 5–8, a tonneau cover assembly 76 made in accordance with the teachings of a second embodiment of the invention is provided and which is particularly useful or suited for those vehicles 72 having a "headache bar" 82 deployed over a back window 73 including a rubber seal 74.

In this alternate tonneau cover assembly embodiment, the "headache bar" 82 is initially removed from cab 40 and a substantially "U" shaped trough 84 is installed, by means of conventional screws 77 or other known securing means, to and along substantially the entire length of cab 18 just below window 73 and partially inserted behind window seal 74. It should be realized by those of ordinary skill in the art that other shapes for trough 84 may be utilized and are within the scope of this invention. Bar 82 is reattached to cab 18 through trough 84.

Trough 84 includes at least one opening 90 which communicates to another opening 92 which may be placed in the bottom of bed 18. Such communication may be achieved, for example and without limitation, by use of a drain tube 94 having, in one embodiment, a diameter of about one half inch. In this embodiment, tube 94 is frictionally and removably secured within trough 84 by means of a flange 100 which may itself be glued or otherwise secured within trough 84 by conventional means. A similar flange assembly may be used to secure tube 94 to opening 92. In this manner, water or moisture entering trough 84 is channeled or drained away from bed 18 and cover 12 by use of drain 94.

Further, in this alternate embodiment, tonneau cover 12 is removably and frictionally attached to longitudinally coextensive lip 98 of trough 84 by removable engagement with substantially "c" shaped clip 104 which may be sewn or otherwise secured within tonneau cover 18.

Figure 6:
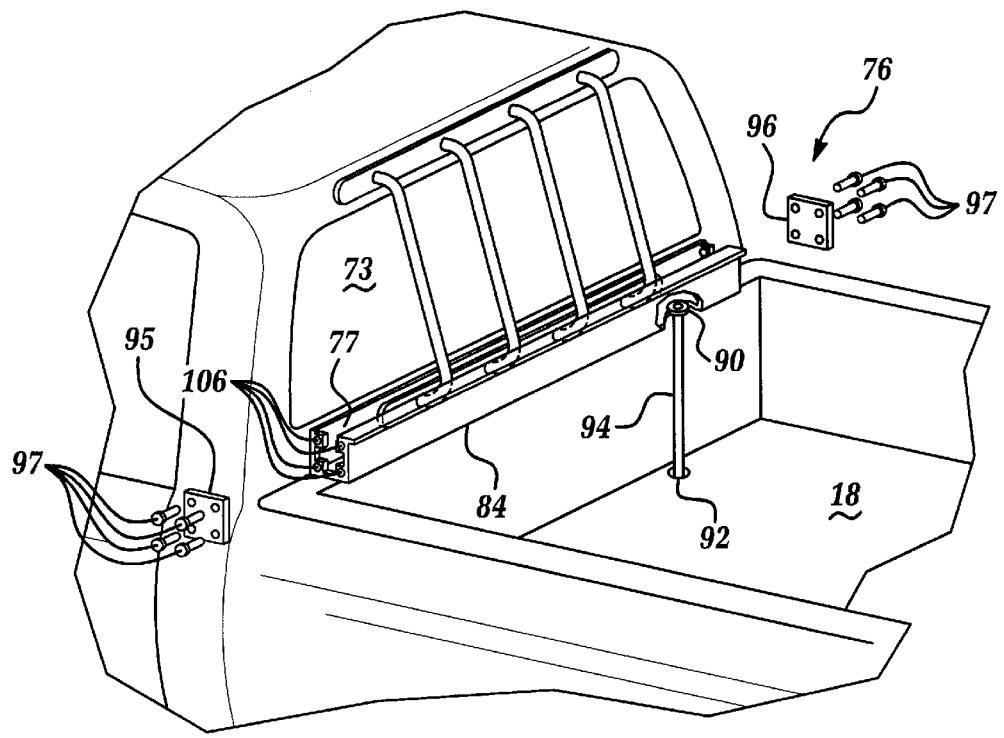
FIG. 6 is a partial perspective view of the pick-up truck of FIG. 5 in partial assembly relation with the tonneau cover assembly made in accordance with the teachings of the second aspect of this invention.
Figure 7:
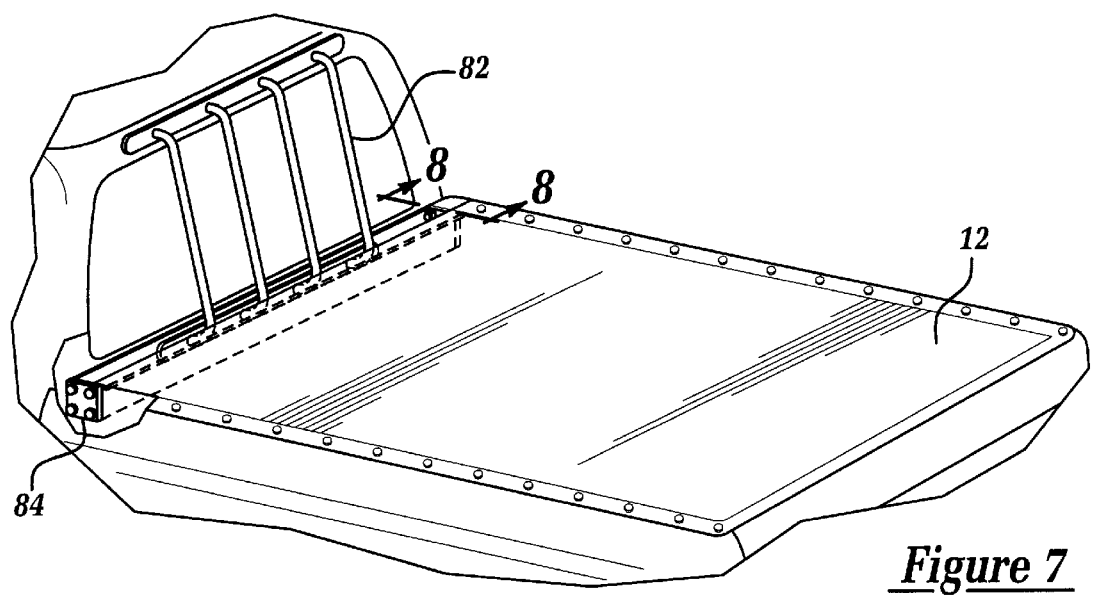
FIG. 7 is a view similar to that of FIG. 6 and showing the tonneau cover deployed in a fully extended bed covering position.
Figure 8:
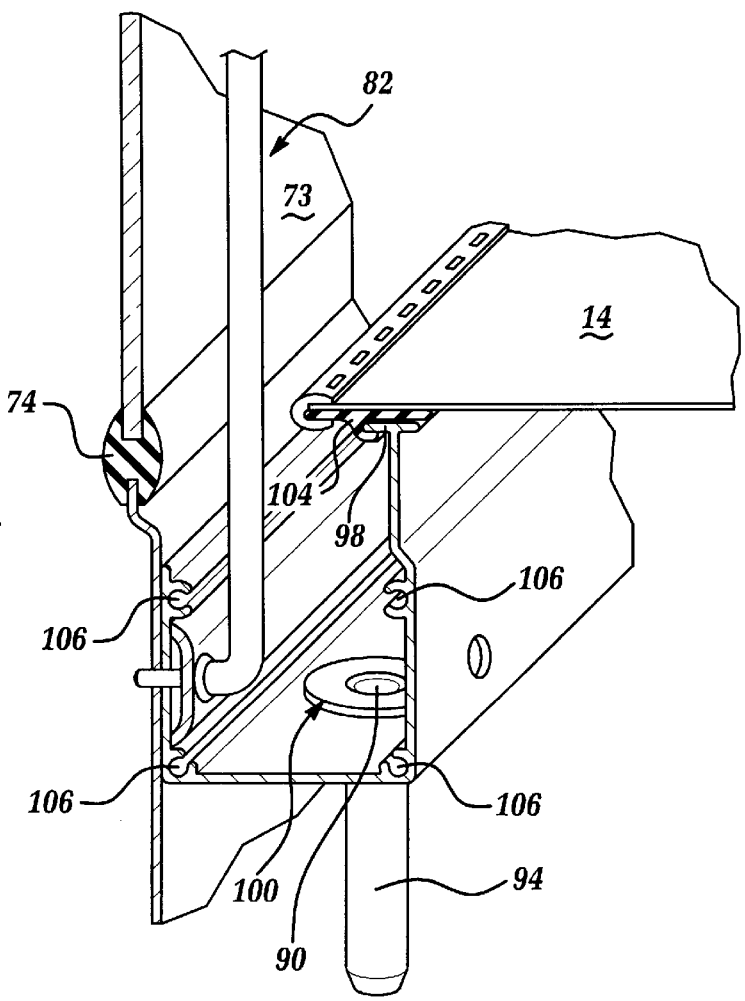
FIG. 8 is a fragmentary perspective view, to a larger scale, of the tonneau assembly made in accordance with the teachings of the second embodiment of the invention and taken substantially along view line 7-7' of FIG. 7.

Further, as illustrated in FIG. 6, this alternate embodiment includes end plates 95 and 96 which are fastened to opposing ends of trough 84 by conventional screws 97 which are adapted to fit securely within openings 106 which are located on both opposing ends of trough 84. End plates 95, 96 substantially ensure that little or no water or moisture drains or escapes out of the opposing ends of trough 84 and into bed 18.

It should be understood that this invention is not limited to the exact construction or embodiments listed and described but that various changes may be made without departing from the spirit and scope of the invention.

Further it should be understood that Applicant has discovered a new tonneau assembly having enhanced moisture barrier and/or drainage characteristics.

What is claimed is:

1. A tonneau assembly for use with a vehicle of the type having substantially identical side rails, a cab, and a bed formed by said side rails and said cab, said tonneau cover assembly adapted to drain water away from said bed, said tonneau assembly comprising:

a tonneau cover;

member means for removable replacement over said substantially identical side rails;

a first member, connected to said member means and having a first grooved surface; and first and second substantially identical corner members, each of said first and second corner members having respective grooved surfaces and being adapted to be removably secured to opposed ends of said first member such that said respective grooved surfaces of each of said first and second corner members are in communication with said grooved surface of said first member, thereby cooperatively providing a channel with which to drain water away from said bed and from said tonneau cover.

2. The tonneau assembly of claim 1 further comprising a seal which is adapted to be placed between said cab and said first member and which is further adapted to direct water into said grooved surfaces of said first member and said first and second corner members.

3. The tonneau assembly of claim 1 further comprising a second seal which is placed within said tonneau cover and which overlays said grooved surfaces when said tonneau cover is placed in a cab covering position.

4. The tonneau assembly of claim 1 wherein said grooved surfaces are centrally aligned.

5. The tonneau assembly of claim 1 wherein said member means comprises a first and a second substantially identical side rail members.

6. The tonneau assembly of claim 5 wherein said vehicle is of a further type having a tailgate, said member means further comprising a third corner member which is adapted to be removably secured to said first rail member; a fourth corner member which is adapted to be removably secured to said second rail member; and a second member adapted to be removably secured to said third and fourth corner members, thereby allowing said tonneau cover to be removably positioned above said tailgate.

7. The tonneau assembly of claim 6 further comprising means for removably securing said tonneau cover to said member means and to said first member.

8. A tonneau assembly for use with a vehicle of the type having substantially identical side walls, a tailgate, and a cab which cooperatively form a bed, said tonneau assembly comprising:

a tonneau cover;

a first member adapted to abut said cab and having a longitudinally coextensive reception slot in abutting relation to a longitudinally coextensive drain;

first and second corner members having a grooved surface and adapted to be removably secured within said reception slot at opposed ends of said first member, thereby allowing said respective grooved surfaces of said corner members to communicate with said drain in order to drain moisture from said tonneau cover;

a first side rail member adapted to be removably secured to said first corner member and to one of said side walls;

a second side rail member adapted to be removably secured to said second corner member and to one of said side rails; and a second member adapted to overlay said tailgate and to be removably connected to said first and said second side members, thereby cooperating with said first and said second side rail members and said first member to provide support for said tonneau cover and to allow said tonneau cover to be moved from a first stored position to a second cab overlaying position.

9. The tonneau assembly of claim 8 further comprising a seal which is adapted to be placed between said first member and said cab and which is further adapted to direct water into said grooved surfaces.

10. The tonneau assembly of claim 9 further comprising a second seal which is placed within said tonneau cover and which overlays said grooved surfaces when said tonneau cover is placed in a cab covering position.

11. The tonneau assembly of claim 8 wherein said cooperating and communicating grooved surfaces are centrally aligned.

12. A method to drain moisture away from a tonneau assembly of the type having a first tonneau cover support member adapted to be attached proximate to a cab of a vehicle and first and second corner members adapted to be removably connected to said first tonneau cover support member and to said vehicle, said method comprising the steps of:

creating a longitudinally coextensive channel in said first tonneau cover support member;

creating channels in each of said first and second corner members; and allowing said created channels to communicate when said first tonneau cover support member and said corner members are deployed upon said vehicle, thereby allowing said cooperating channels to drain water from said tonneau assembly.

* * * * *